Nov. 17, 1964

R. G. MARR 3,157,060

STEERING MECHANISM

Filed Nov. 6, 1961

INVENTOR.
Russell G. Marr
BY
Karness, Dickey & Pierce
ATTORNEYS

Nov. 17, 1964
R. G. MARR
3,157,060
STEERING MECHANISM
Filed Nov. 6, 1961
2 Sheets-Sheet 2
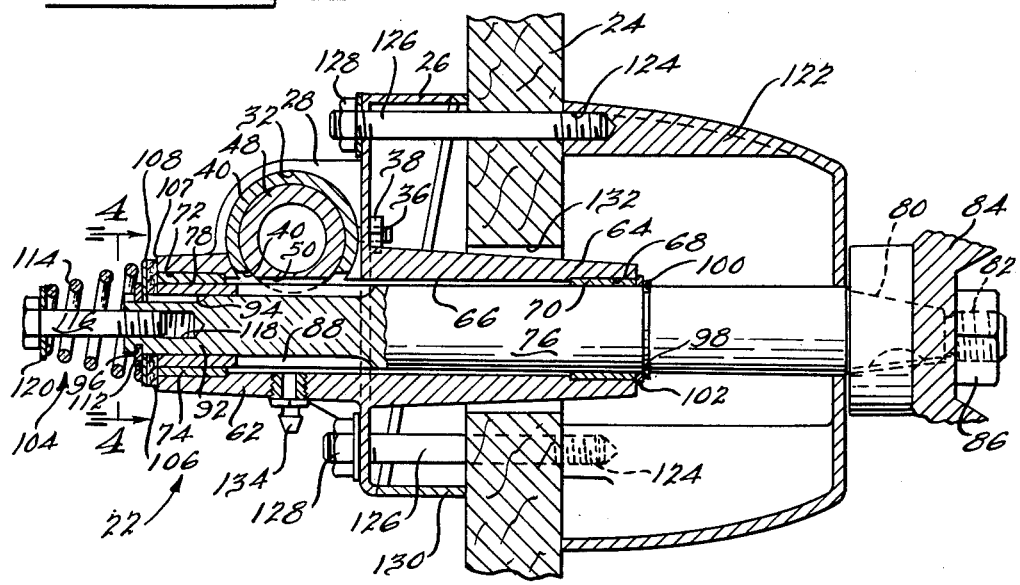
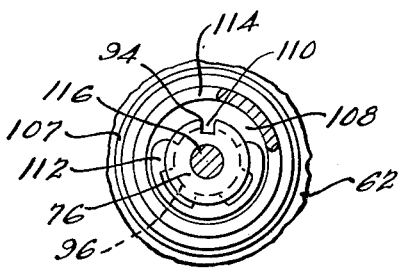
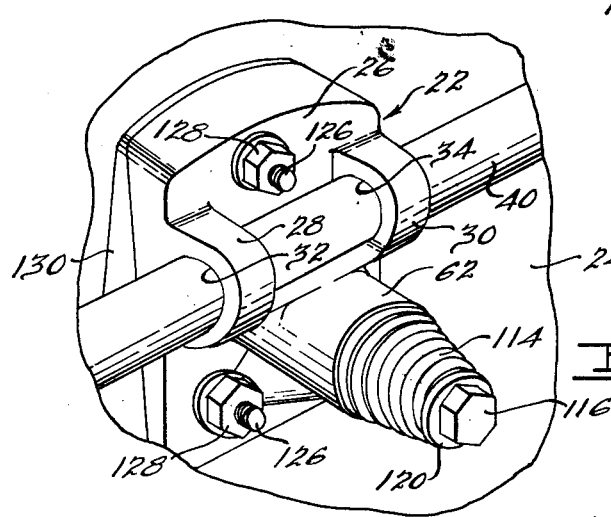
INVENTOR.
Russell G. Marr
BY
Harness, Dickey & Pierce.
ATTORNEYS

United States Patent Office 3,157,060
Patented Nov. 17, 1964

3,157,060
STEERING MECHANISM
Russell G. Marr, Detroit, Mich., assignor to Marmac Products Inc., Detroit, Mich., a corporation of Ohio
Filed Nov. 6, 1961, Ser. No. 150,402
2 Claims. (Cl. 74—485)

The present invention relates to vehicle steering systems, and more specifically to a novel steering mechanism particularly adapted for marine use on motor powered watercraft.

It is a well known phenomenon that boats powered by either single propellers or twin propellers rotating in the same direction, whether inboard or outboard, are subject to a substantial net torque in one direction caused by the reactive torsional forces between the motors and propellers, and that this large net torque constantly tends to turn the craft in one direction. This phenomenon is particularly present in modern high powered lightweight outboard motor boats and single screw inboards, and requires that the operator constantly maintain a countering force on the steering wheel to overcome the turning tendencies of this torque to maintain the craft on course. Even in boats having twin counter-rotating propellers, where this phenomenon is less of a problem, there still may be forces applied to the rudder or hull by the water or wind which require the constant application of a resisting force to the steering wheel to maintain the craft on course. It is to the elimination of this burden on the operator that the present invention is primarily directed.

Accordingly, it is a primary object of the present invention to provide a novel steering system having means for constantly resisting but not preventing rotational movement of the steering wheel in all positions thereof, whereby stability will be imparted to the steering system and the need for constantly applying a torque-countering force to the wheel by the operator will be eliminated.

A further object resides in the provision of an extremely simple and hence economical steering mechanism wherein there is provided conveniently and easily adjustable friction means for introducing any predetermined amount of drag or resistance to the operation of the mechanism, the friction means being so constructed as to be capable of being accurately pre-set to counter any forces created by propeller torque or the like and adversely affecting steering.

Yet another object concerns the provision of a unique torque compensator which is readily adapted for use with boat steering mechanisms to counter the adverse forces applied thereto by propeller torque or the like.

These and other objects of the present invention will become apparent from consideration of the specification taken in conjunction with the accompanying drawings in which there is illustrated an embodiment of the present invention, and wherein:

FIGURE 3 is a transverse sectional view taken along line 3—3 in FIGURE 2;

FIGURE 4 is a fragmentary sectional view taken along line 4—4 in FIGURE 3; and

FIGURE 5 is an enlarged perspective view of a portion of the apparatus illustrated in FIGURE 1.

Generally speaking, the vehicle steering system of the present invention comprises a housing having a bore therein, a manually rotatable steering shaft journaled in the bore, means responsive to rotation of the steering shaft for controlling direction of movement of the vehicle, and adjustable friction means operational between the steering shaft and the housing for resisting rotation of the steering shaft with respect to the housing, whereby stability will be imparted to the steering system. In its more limited aspects the present invention comprises a friction device which may be interposed between a conventional steering shaft and its associated support housing to impart stability to the operation of the mechanism. Although the invention is embodied herein in a device for use with watercraft it is not necessarily limited thereto and may be applied in any application wherein there is need for stabilizing a steering or analogous system to resist a biasing force.

Figure 1:
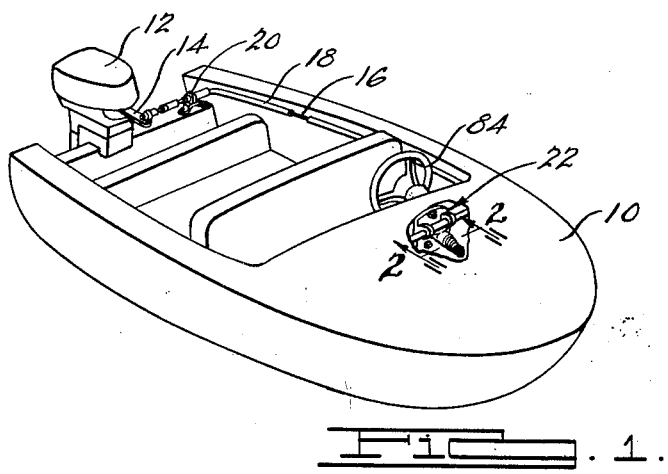
FIGURE 1 is a perspective view of an outboard motor boat with a portion thereof broken away to illustrate an embodiment of the present invention mounted therein.

Referring more particularly to the drawings, there is illustrated in FIGURE 1 a boat 10 having secured to the transom thereof in the conventional manner an outboard motor 12 having a steering arm 14. Pivotally secured to the outer end of arm 14 in the usual manner is a push-pull steering cable 16 slidably disposed within a cable sheath 18, the rearward end of which is secured to the transom of the boat by means of a bracket 20. Cable 16 passes through sheath 18 forwardly to a steering mechanism, indicated generally at 22, secured to the dashboard 24 of the boat, the forward end of cable 16 being shown in FIGURE 2.

Figure 2:
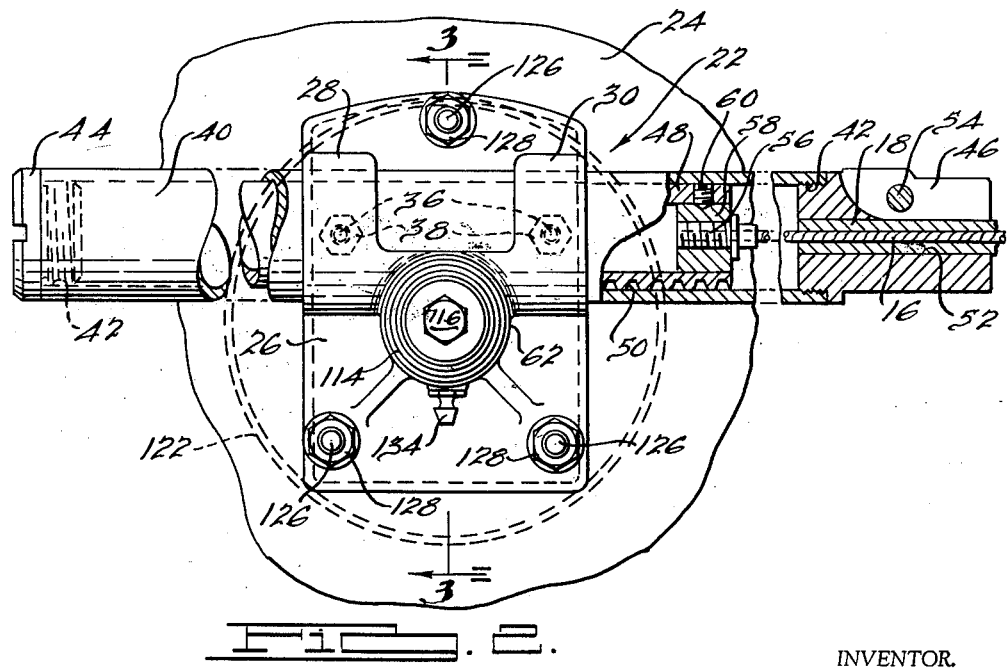
FIGURE 2 is a front elevational view looking substantially along line 2—2 in FIGURE 1.

Steering mechanism 22 comprises generally a hollow housing 26 having on the forward face thereof a pair of forwardly projecting ears 28 and 30 provided with transversely extending horizontally aligned apertures 32 and 34, respectively. Rigidly secured within apertures 32 and 34, such as by means of suitable set screws 36 and jam nuts 38, is a horizontal transversely disposed guide tube 40. As can be seen in FIGURE 2, the inside surface of the guide tube is threaded at each end, as at 42, to threadably receive a slotted closure plug 44 at one end and a bifurcated cable clamp 46 at the other end. Slidably disposed within guide tube 40 is a rack 48 of hollow generally circular cross-section having rack teeth 50 along the lower edge thereof. Rack 48 is of a diameter just slightly less than the inside diameter of the guide tube so that relative sliding is possible without undue looseness.

As can be seen in FIGURE 2, in the present embodiment cable sheath 18 extends into a clamping opening 52 in cable clamp 46 wherein it is tightly clamped by means of a suitable tightening screw 54 which acts to pull together the bifurcated halves of the cable clamp. Steering cable 16 passes through the cable guide into the interior of guide tube 40, this end of the steering cable being provided with a threaded lug 56 which is threadably received within the central aperture of a threaded bushing 58 tightly secured within rack 48 by means of a suitable set screw or the like 60. As can be seen, reciprocatory movement of the rack within the guide tube will thus cause the steering cable to reciprocate within sheath 18 to pivot motor 12 back and forth to steer the boat. In the case of inboard motor boats the same operation would occur, but the rearward end of cable 16 would be operatively secured to a rudder rather than the steering arm of an outboard motor.

Housing 26 also includes forwardly and rearwardly extending coaxial bosses 62 and 64 through which extends a bore 66, the axis of which lies at right angles to and slightly below apertures 32 and 34, as best seen in FIGURE 3. The rearward end of bore 66 is counterbored at 68 and provided therein with a sleeve bearing 70, and the forward end thereof is counterbored at 72 to receive a sleeve bearing 74. Supported for rotational movement within bore 66 is a steering shaft 76. The main portion of steering shaft 76 is rotatably supported by bearing 68, whereas the forward portion thereof, which is of slightly reduced diameter, is supported by a bushing 78 rotatably supported by bearing 74. At its rearward end shaft 76 is provided with a tapered seat portion 80 terminating in a threaded portion 82, seat portion 80 being adapted to receive a steering wheel 84 of conventional construction and maintained in place by a nut 86 threadably secured to portion 82. Adjacent its forward end steering shaft 76 is provided with a plurality of axially directed pinion teeth 88 adapted to engage with teeth 50 on rack 48. As can be seen in FIGURE 3, guide tube 40 is provided with a transverse slot 90 so that teeth 50 on the rack are exposed for engagement with teeth 88. Thus, rotation of steering shaft 76 will impart longitudinal movement to rack 48 and hence cable 16.

The portion of steering shaft 76 extending forwardly of spline teeth 88, which portion is indicated at 92, is provided with an axial key slot 94 and a circumferential groove 96, and extends slightly forwardly of the end of bore 66, the steering shaft being retained against displacement in the forward direction by means of a snap ring 98 resiliently disposed in a circumferential groove 100 in the steering shaft. For reducing frictional wear caused by rotation of the steering shaft there is provided a washer 102 of suitable material between snap ring 98 and the adjacent end of boss 64.

At the forward end of steering shaft 76 is provided the torque compensator of the present invention, generally indicated at 104, which serves a double purpose, namely (1) introducing resistance to rotation of the steering shaft with respect to the housing for stabilizing operation of the steering system, and (2) preventing rearward axial movement of the steering shaft in bore 66. Torque compensator 104 comprises a washer 106 of frictional material loosely positioned upon portion 92 of the drive shaft and adapted to frictionally engage a planar end surface 107 on boss 62. Frictionally abutting the forward face of washer 106 is a second washer 108 formed of metal or the like having a centrally directed projection 110 disposed in key slot 94 so that the washer will rotate with the steering shaft. Washer 108 is loosely maintained against extreme forward axial displacement on shaft 66 by means of a resilient snap ring 112 resiliently engaged in circumferential groove 96. To create frictional resistance to rotation of the steering shaft in the housing, washer 108, which rotates with the shaft, is resiliently urged against friction washer 106 to pinch it against the surface 107 on boss 62 by means of a tapered coiled compression spring 114 maintained in a compressed position by means of an adjustable holding member in the form of a machine screw or the like 116 threadably engaged within an axial threaded bore 118 in the forward end of steering shaft 76. A washer 120 may be provided between the head of machine screw 116 and spring 114. As will be appreciated, the amount of compression of spring 114, and hence the amount of resistance introduced to rotation of the shaft in the housing, may be easily regulated by simply screwing threaded holding member 116 into and out of bore 118. As will be appreciated, the resilient force exerted against the forward face of the housing by spring 114 is opposed by the equal reactive force of snap ring 98 against the rearward face of the housing. Also, since washer 108 rotates with shaft 76 there is no tendency for such rotation to cause holding member 116 to turn relative to the shaft to inadvertently alter the compression of spring 114. Although the torque compensator of the present invention is illustrated in conjunction with a specific type of steering mechanism, such is not essential since it is readily adapted for use with conventional steering mechanisms of other designs, as will be readily apparent to those skilled in the art.

In the embodiment illustrated the steering mechanism is secured to dashboard 24 in the conventional manner, there being provided an ornamental housing 122 disposed on the cockpit side of the dashboard and provided with a plurality of threaded apertures 124 in which are threadably disposed studs 126 passing through the dashboard and suitably positioned apertures in housing 26 and provided with nuts 128 to hold the housing in place against the dashboard. Tightly clamped between housing 26 and dashboard 24 is a wedge-shaped spacer member 130 of conventional construction for compensating for the inclination, if any, of dashboard 24, the latter being provided with an aperture 132 through which boss 64 may pass. For convenience of lubrication of the steering shaft and rack and pinion arrangement, there is provided a conventional lubrication nipple 134 through the lower wall of boss 62.

In actual practice, the mechanism of the present invention is extremely easy to adjust and use. Assuming, for example, that the steering mechanism is utilized on a boat having a single outboard motor, such as that illustrated in FIGURE 1, the entire unit would be installed in the craft in the manner described with the holding member backed off to reduce the amount of resistance caused by the friction member to substantially zero. The boat would then be taken on a test run and the steering wheel positioned to steer a relatively straight course. Since the torque compensator would not be functioning at this time the operator would have to correct for the torque created by the propeller which would tend to turn the boat in one direction. At this point the holding member, namely machine screw 116, would be gradually tightened until there is created sufficient resistance to rotation of the steering shaft with respect to the housing to just overcome the turning torque of the propeller. In other words, the holding member would be gradually tightened until it is no longer necessary for the operator to hold onto the steering wheel to hold the craft on a straight course. With the torque compensator properly pre-set in this manner it thus becomes necessary for the operator to apply a force to the steering wheel only when it is desired to turn the craft. Due to the design of the friction member, including the fact that it operates in a plane perpendicular to the axis of the steering shaft, the amount of resistance which must be overcome to turn the craft is substantially the same in both directions of rotation of the steering wheel, and in actual practice it has been found that the additional effort necessary to turn a craft provided with the present torque compensaor is not objectionable.

Thus, there is disclosed in the above description and in the drawings an exemplary embodiment of the invention which fully and effectively accomplishes the objects thereof. However, it will be apparent that variations in the details of construction may be indulged in without departing from the sphere of the invention herein described, or the scope of the appended claims.

What is claimed is:

1. In a steering system for a vehicle comprising a housing having a bore therein and a substantially flat surface thereon surrounding said bore, a manually rotatable steering shaft journaled in said bore, means including steering means supported adjacent one end of said steering shaft operable for reciprocal transverse movement relative to said steering shaft for controlling the movement of said vehicle, means adjacent said one end of said steering shaft engaging said steering means to control the direction of reciprocal movement thereof in response to the rotation of said steering shaft, and resisting means mounted at said one end of said steering shaft and operable between said steering shaft and said housing for resisting relative rotation of said steering shaft with respect to said housing, said resisting means including a substantially flat annular friction member nonrotatively mounted on said one end of said steering shaft for frictionally engaging said flat surface on said housing, resilient biasing means engaging an axially outer surface of said friction member for axially urging said friction member against said flat surface, and means threadedly mounted on said shaft and coaxial with said resilient biasing means for adjusting the compression thereof to impart an adjustable degree of stability to the steering system.

2. The combination of claim 1 further including an annular friction washer interposed between said friction member and said flat surface.

References Cited by the Examiner

UNITED STATES PATENTS

| | | |
|---|---|---|
| 1,382,529 | 6/21 | Morton. |
| 1,727,778 | 9/29 | Kull _____ 74—531 |
| 2,757,553 | 8/56 | Marr. |
| 3,000,591 | 9/61 | Backlin _____ 188—83 X |

FOREIGN PATENTS 674,749  7/52  Great Britain.

DON A. WAITE, *Primary Examiner.*
BROUGHTON G. DURHAM, *Examiner.*